Patented Sept. 15, 1953

2,652,391

UNITED STATES PATENT OFFICE 2,652,391

COPOLYMERS OF ALPHA-METHYLSTYRENE AND ALPHA-METHACRYLONITRILE

Roger M. Schulken, Jr., and Ralph E. Boy, Jr., Kingsport, Tenn., assignors to Eastman Kodak Company, Rochester, N. Y., a corporation of New Jersey No Drawing. Application August 22, 1951, Serial No. 243,188

12 Claims. (Cl. 260—85.5)

This invention relates to resinous copolymers of alpha-methylstyrene and alpha-methacrylonitrile, and to a process for their preparation.

It is known that alpha-methylstyrene does not homopolymerize to a high molecular weight resin by use of the usual free radical mechanism catalysts. However, it readily forms resinous copolymers with certain other unsaturated monomers. For example, Fordyce et al. in J. Amer. Chem. Soc. 70, pages 2489–92 (1948) describe various percentage copolymers of alpha-methylstyrene and alpha-methacrylonitrile. These copolymers were prepared by mass polymerization at 80° C., in the presence of benzoyl peroxide. While these copolymers are resinous in character, we have found that they have relatively low molecular weights, not exceeding 50,000 as calculated from the estimated formula:

$$[N] = 3.7 \times 10^{-4} M^{0.87}$$

wherein [N] is the inherent viscosity in dimethyl formamide solution and M is the molecular weight. The inherent viscosity is determined from the relationship:

$$[N] = \frac{2.303 \log T_1/T_0}{C}$$

Where $T_1$ = flow time of the solution.
$T_0$ = flow time of the solvent.
$C$ = concentration of the copolymer in g./100 cc. of solution.

These copolymers are also characterized by being very brittle and by softening drastically in boiling water. Furthermore, the actual process of copolymerization gives only a small percentage of polymer. It is apparent, therefore, that the utility of these copolymers is severely limited, especially for the commercial production of various shaped objects requiring low cost and dimensional stability.

In contrast to the teachings of the prior art, we have found that copolymers of alpha-methylstyrene and alpha-methacrylonitrile containing from 0.4 to 0.6 mole fraction of alpha-methylstyrene, when prepared by carrying out the copolymerizations in the presence of redox system of polymerization catalysts, show not only higher yields of copolymer and greatly increased molecular weights ranging approximately from 90,000 to 250,000 as measured and calculated by use of the above formulas, but give on coating or molding, shaped objects which are clear, colorless, non-brittle and possessing unusually good resistance to distortion by heat; for example, they can be boiled in water for an hour or more and autoclaved for sterilization without measurable distortion.

The following table shows the variation in yield and heat distortion temperature in relation to composition of the alpha-methylstyrene/alpha-methacrylonitrile copolymers of the invention.

Table

| Mole Fraction of Alpha-methylstyrene | Percent Yield | Heat Distortion Temperature, ° C. |
|---|---|---|
| 0.1 | 98 | 108 |
| 0.2 | 97 | 113 |
| 0.3 | 96 | 119 |
| 0.4 | 95 | 129 |
| 0.5 | 90 | 146 |
| 0.6 | 85 | 130 |
| 0.65 | 73 | 122 |
| 0.67 | 65 | 120 |

In a comparative test a copolymer having an inherent viscosity of 1.0, composed of approximately equal moles of alpha-methylstyrene and alpha-methacrylonitrile and prepared with redox catalysts in accordance with the invention, had a heat distortion temperature of 138° C. compared to a value of 80° C. for a standard commercial methacrylate resin, 108° C. for a heat resistant commercial methacrylate resin and 115° C. for a heat resistant commercial styrene copolymeric resin.

It is, accordingly, an object of the invention to provide copolymers of alpha-methylstyrene and alpha-methacrylonitrile containing from 0.4 to 0.6 mole fraction of alpha-methylstyrene and having a molecular weight of from 90,000 to 250,000. Another object is to provide a process for preparing these copolymers. Other objects will become apparent hereinafter.

In accordance with the invention, we prepare copolymers containing from 0.4 to 0.6 mole fraction of alpha-methylstyrene and from 0.6 to 0.4 mole fraction of alpha-methacrylonitrile by an emulsion polymerization process, wherein a mixture of the monomers in the above proportions is heated at a temperature of from 35° to 85° C. for a period of from several hours to several days, in the presence of a dispersing agent and a persulfate type polymerization catalyst such as ammonium persulfate, sodium persulfate, potassium persulfate, etc., and in the presence of an oxidizable oxygen bearing sulfur compound such as sulfur dioxide, sodium bisulfite, sodium sulfite, ammonium bisulfite, sodium hydrosulfite, sodium thiosulfate, etc. The preferred catalyst comprises potassium persulfate and sodium bisulfite. Advantageously, the persulfate compound is present in amount of from about .01% to 5%, and the oxidizable sulfoxy compound is present in amount of from about .001% to 5%, based in each case on the total weight of monomers employed. Pressures higher than atmospheric can be employed. Suitable dispersing agents include salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.) salts of aromatic sulfonic acids (e. g. sodium or potassium salts of alkyl naphthalene sulfonic acids, etc.) and higher molecular weight quaternary ammonium salts (e. g. dimethylbenzyl phenyl ammonium chloride, quaternary salts containing the radicals $C_{15}H_{31}$ and $C_{17}H_{35}$, etc.). However, salts of higher fatty alcohol sulfates are preferred such as sodium lauryl sulfate.

The following examples will serve further to illustrate the copolymers of the invention and the manner of preparing the same.

*Example 1*

One mole each of alpha-methylstyrene and alpha-methacrylonitrile were mixed together and then added to an aqueous solution of 0.2 per cent of sodium lauryl sulphate, 0.2 per cent of potassium persulfate and a trace of sodium bisulfite (.02%), in the ratio of one part of monomer to three parts of water. The mixture was heated with agitation in a glass lined vessel for 60 hours at 70° C. Water was removed from the resulting emulsion by evaporation and the residual powder was washed with water, then with methanol and finally boiled for one hour in a water slurry. The dried copolymer had an inherent viscosity of 0.8 as measured in N,N-dimethyl formamide. The copolymer had an estimated molecular weight of 95,000.

The product was injection molded at about 200° C. to give a clear, almost colorless specimen which had a heat distortion temperature of 138° C. Hardness and impact and tensile strength values were of the order of those of commercial styrene and methacrylate resins. Fexural strength was appreciably greater. Exposure in a weatherometer for 990 hours produced only 25 per cent breakdown in molecular weight as measured by intrinsic viscosity; appearance was affected only a small amount.

*Example 2*

A sample prepared as in Example 1, except that the temperature of polymerization was maintained at 40° C. had an inherent viscosity of 1.56 which was equivalent to an estimated molecular weight of 243,000. This sample molded well to produce clear, almost colorless specimens which had an impact strength of about twice that of commercial polystyrenes, and a heat distortion temperature of 146° C. On heating to 232° C. (holding above 200° C. for 30 minutes), no detectable color change occurred.

The copolymers of the invention prepared as described have general utility in the plastic resin field, but are particularly useful for preparing injection molded articles which are characterized by high resistance to distortion by heat, and good flexural strength, tensile strength, hardness, dimensional stability, etc. This is all the more remarkable because polyacrylonitrile itself is not stable at molding temperatures. The copolymers of the invention can be incorporated into molding compositions which may contain, if desired, fillers, other resinous materials, dyes, plasticizers, etc. These copolymers are particularly applicable to the production of articles such as tumblers, kitchen utensils, and the like, which are frequently subjected to hot or boiling water. They can also be used where the molded article must withstand the temperature of moderately high pressure steam such as in the sterilization of medical equipment. They are also useful for molding parts for electrical equipment which must withstand moderately high temperatures for relatively long periods of time.

In describing the properties of the copolymers of the invention, reference has been made to "heat distortion temperature." This value was determined by measuring the change in length of a lightly loaded standard bar as the temperature increased at a constant rate. The shank of the bar was 0.25 inch square and one inch long. It was injection molded from one end. As the temperature increased, a point was reached where the resin became flowable enough for the molded-in stresses to begin to distort the bar and cause it to shrink. This point was taken as the heat distortion temperature. As the temperature continued to rise, the sample continued to shrink in relation to the amount of molded-in stresses present until a temperature was reached where the stresses relaxed. Then the light load began to extend the bar slowly at first with a rapidly increasing rate of extension. The amount of shrinkage and the temperature of rapid elongation are related to the molding properties and conditions of the specimen under investigation. When the length of the specimen is plotted as a function of the temperature, the curve obtained gives considerable information on the behavior of the resin on heating. Such curves indicate clearly that the relationship between molding temperature and heat distortion temperature for the copolymers of the invention is considerably better than a similar relationship for commercial resins represented by polymethacrylates and polystyrenes.

What we claim is:

1. A resinous copolymer consisting of from 0.4 to 0.6 mole fraction of alpha-methylstyrene and from 0.6 to 0.4 mole fraction of alpha-methacrylonitrile, and having a molecular weight of from 90,000 to 250,000 as determined by the inherent viscosity of said copolymer in N,N-dimethyl formamide.

2. A resinous copolymer consisting of equal mole fractions of alpha-methylstyrene and of alpha-methacrylonitrile, and having a molecular weight of from 90,000 to 250,000 as determined by the inherent viscosity of said copolymer in N,N-dimethyl formamide.

3. A resinous copolymer consisting of 0.4 mole fraction of alpha-methylstyrene and 0.6 mole fraction of alpha-methacrylonitrile, and having a molecular weight of from 90,000 to 250,000 as determined by the inherent viscosity of said copolymer in N,N-dimethyl formamide.

4. A resinous copolymer consisting of 0.6 mole fraction of alpha-methylstyrene and 0.4 mole fraction of alpha-methacrylonitrile, and having a molecular weight of from 90,000 to 250,000 as determined by the inherent viscosity of said copolymer in N,N-dimethyl formamide.

5. A resinous copolymer consisting of equal mole fractions of alpha-methylstyrene and of alpha-methacrylonitrile, and having a molecular weight of approximately 95,000 as determined by the inherent viscosity of said copolymer in N,N-dimethyl formamide.

6. A resinous copolymer consisting of equal mole fractions of alpha-methylstyrene and of alpha-methacrylonitrile, and having a molecular weight of approximately 243,000 as determined by the inherent viscosity of said copolymer in N,N-dimethyl formamide.

7. A process for preparing a resinous copolymer consisting of from 0.4 to 0.6 mole fraction of alpha-methylstyrene and 0.6 to 0.4 fraction of alpha-methacrylonitrile, and having a molecular weight of from 90,000 to 250,000, which comprises heating a mixture containing in the ratio of from 0.4 to 0.6 mole fraction of alpha-methylstyrene and from 0.6 to 0.4 mole fraction of alpha-methacrylonitrile in aqueous dispersion, at a temperature of from 35° to 85° C., in the presence of from .01% to 5%, based on the total weight of monomers present, of an inorganic persulfate selected from the group consisting of ammonium persulfate, sodium persulfate and potassium persulfate, and from .001% to 5%, based on the quantity of monomer, of an inorganic oxidizable sulfur compound selected from the group consisting of sulfur dioxide, sodium bisulfite, sodium sulfite, ammonium bisulfite, sodium hydrosulfite and sodium thiosulfate, until polymerization of the monomers is essentially complete.

8. A process for preparing a resinous copolymer consisting of equal mole fractions of alpha-methylstyrene and of alpha-methacrylonitrile, and having a molecular weight of from 90,000 to 850,000, which comprises heating a mixture containing equal mole fractions of alpha-methylstyrene and alpha-methacrylonitrile in aqueous dispersion, at a temperature of from 35° to 85° C., in the presence of from .01% to 5%, based on the total weight of monomers present, of potassium persulfate, and from .001% to 5%, based on the quantity of monomer, of sodium bisulfite, until polymerization of the monomers is essentially complete.

9. A process for preparing a resinous copolymer consisting of 0.4 mole fraction of alpha-methylstyrene and 0.6 mole fraction of alpha-methacrylonitrile, and having a molecular weight of from 90,000 to 250,000, which comprises heating a mixture containing in the ratio of 0.4 mole fraction of alpha-methacrylonitrile and 0.6 mole fraction of alpha-methacrylonitrile in aqueous dispersion, at a temperature of from 35° to 85° C., in the presence of from .01% to 5%, based on the total weight of monomers present, of potassium persulfate, and from .001% to 5%, based on the quantity of monomer, of sodium bisulfite, until polymerization of the monomers is essentially complete.

10. A process for preparing a resinous copolymer consisting of 0.6 mole fraction of alpha-methylstyrene and 0.4 mole fraction of alpha-methacrylonitrile, and having a molecular weight of from 90,000 to 250,000, which comprises heating a mixture containing in the ratio of 0.6 mole fraction of alpha-methacrylonitrile and 0.4 mole fraction of alpha-methacrylonitrile in aqueous dispersion, at a temperature of from 35° to 85° C., in the presence of from .01% to 5%, based on the total weight of monomers present, of potassium persulfate and from .001% to 5%, based on the amount of monomer, of sodium bisulfite, until polymerization of the monomers is essentially complete.

11. A process for preparing a resinous copolymer consisting of equal mole fractions of alpha-methylstyrene and alpha-methacrylonitrile, and having a molecular weight of approximately 95,000, which comprises heating a mixture containing equal mole fractions of alpha-methylstyrene and alpha-methacrylonitrile in aqueous dispersion, at a temperature of approximately 70° C., in the presence of approximately 0.2%, based on the total weight of monomers present, of potassium persulfate and approximately .02%, based on the amount of monomer, of sodium bisulfite, until polymerization of the monomers is essentially complete.

12. A process for preparing a resinous composition consisting of equal mole fractions of alpha-methylstyrene and alpha-methacrylonitrile, and having a molecular weight of approximately 243,000, which comprises heating a mixture containing equal mole fractions of alpha-methylstyrene and alpha-methacrylonitrile in aqueous dispersion, at a temperature of approximately 40° C., in the presence of approximately 0.2%, based on the total weight of monomers present, of potassium persulfate and approximately .02%, based on the amount of monomers, of sodium bisulfite, until polymerization of the monomers is essentially complete.

ROGER M. SCHULKEN, Jr.
RALPH E. BOY, Jr.

References Cited in the file of this patent

UNITED STATES PATENTS

| Number | Name | Date |
|---|---|---|
| 2,486,241 | Arnold | Oct. 25, 1949 |
| 2,496,384 | De Nie | Feb. 7, 1950 |

OTHER REFERENCES

Fordyce et al.: J. A. C. S. 70, 2489–2492 (1948).

U. S. DEPARTMENT OF COMMERCE
PATENT OFFICE

CERTIFICATE OF CORRECTION

Patent No. 2,652,391    Roger M. Schulken, Jr., et al.    September 15, 1953

It is hereby certified that error appears in the printed specification of the above numbered patent requiring correction and that the said Letters Patent should read as corrected below.

Column 1, line 20, for the superscript appearing at the end of the formula reading "0.87" read -- 0.67 --.

Signed and sealed this 24th day of June 1958.

(SEAL)
Attest:

KARL H. AXLINE
Attesting Officer

ROBERT C. WATSON
Commissioner of Patents